July 30, 1935.  L. MAGNEY  2,009,628

TROLLER TRANSMISSION FOR OUTBOARD MOTORS

Filed April 11, 1933   2 Sheets-Sheet 1

Leo Magney, INVENTOR

BY Victor J. Evans & Co.

ATTORNEY

WITNESS:

July 30, 1935.	L. MAGNEY	2,009,628
TROLLER TRANSMISSION FOR OUTBOARD MOTORS
Filed April 11, 1933    2 Sheets-Sheet 2
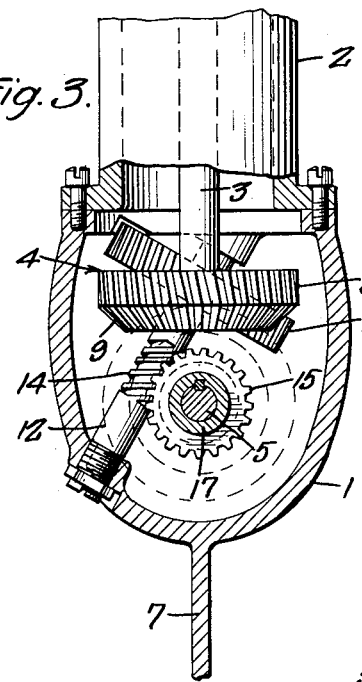
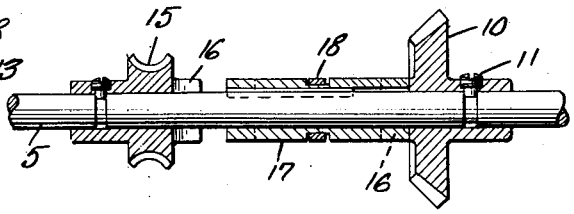
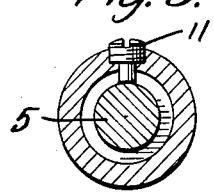
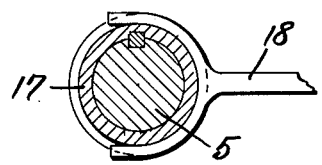
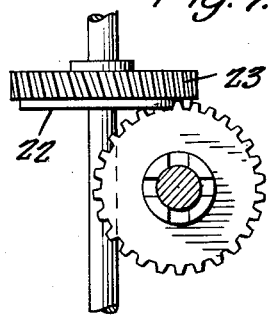
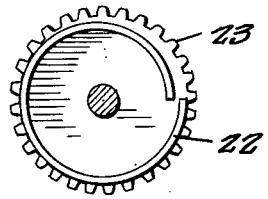
Leo Magney, INVENTOR Patented July 30, 1935

2,009,628

UNITED STATES PATENT OFFICE 2,009,628

TROLLER TRANSMISSION FOR OUTBOARD MOTORS

Leo Magney, Grand Forks, N. Dak.

Application April 11, 1933, Serial No. 665,580

1 Claim. (Cl. 115—17)

This invention relates to transmissions especially adapted for outboard engines employed for propelling boats and has for the primary object, the provision of a device of the above stated character which consists of a minimum number of parts to conserve space and cost of production and maintenance and which will permit variable speeds between the engine and the propeller so that a boat may be driven at very slow speeds when desired and thereby permit a boat equipped with an engine of this character to be employed for trolling and similar purposes and also render the handling of the boat easier when docking or navigating shallow or dangerous waters.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a fragmentary vertical sectional view illustrating a transmission for outboard engines and constructed in accordance with my invention.

Figure 3 is a fragmentary transverse sectional view illustrating the speed changing gears of the transmission.

Figure 4 is a detail sectional view illustrating the clutch for the transmission.

Figure 5 is a detail transverse sectional view illustrating means of rotatably connecting a gear to one of the shafts of the transmission.

Figure 6 is a detail sectional view illustrating a forked arm for effecting movement of the clutch.

Figure 7 is a detail view illustrating a modified form of speed changing gears of the transmission.

Figure 8 is a plan view illustrating one of the gears of the modified form of my invention.

Figure 1:
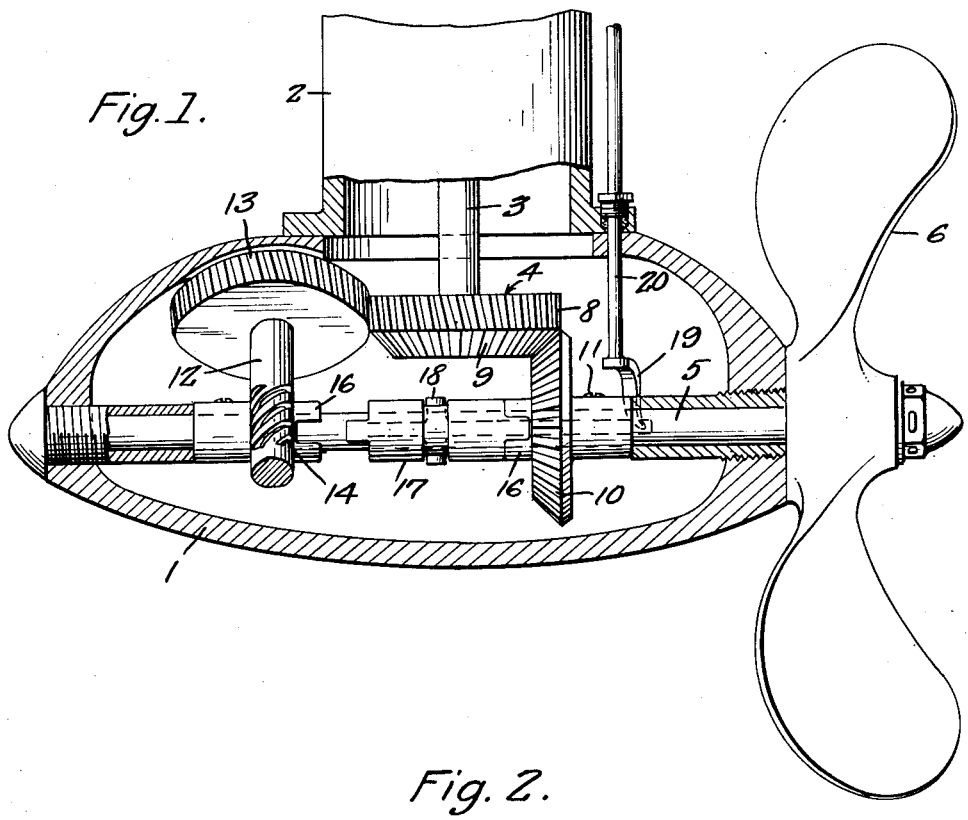
Figure 2:
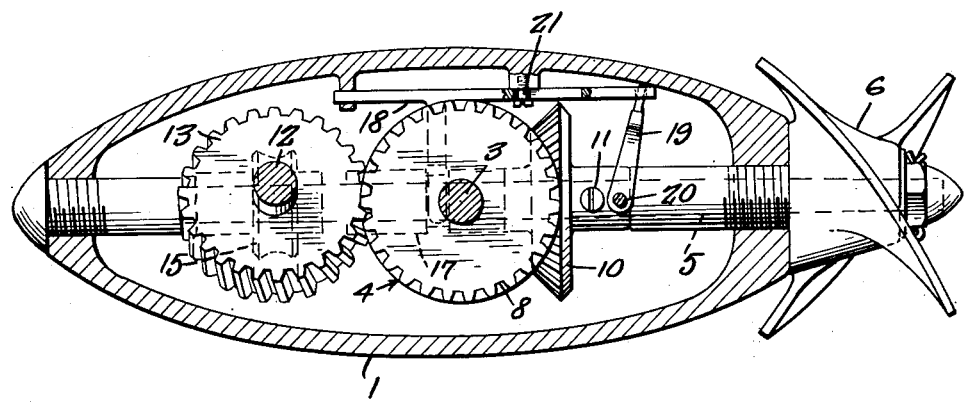
Figure 2 is a longitudinal sectional view illustrating the same.

Referring in detail to the drawings, the numeral 1 indicates a transmission housing of an outboard engine for boats in which the housing is supported by a sleeve 2 carried by the engine. The power shaft 3 of the engine extends through the supporting sleeve into the transmission housing and has secured thereto a drive gear 4. Journaled in the transmission housing 1 is a propeller shaft 5, one end of which extends through the rear end of the housing and has secured thereto a propeller 6. The housing 1 also carries a fin 7 to act as a rudder, it being understood that the housing and sleeve may turn about a vertical axis for effecting steering of the boat. The housing 1 is of torpedo shape to reduce resistance of water thereagainst.

The gear 4 is provided with teeth 8 and 9. The teeth 9 are of the bevel type and mesh with a beveled gear 10 journaled on the shaft 5 by a set bolt 11 fitting in a groove in the shaft to prevent the gear from moving endwise of the propeller shaft. A counter shaft 12 is journaled in the housing 1 and has secured thereto a speed reducing gear 13 meshing with the teeth 8 of the drive gear 4. The counter shaft 12 carries a worm 14 which meshes with a worm gear 15 journaled on the propeller shaft 5. The gears 10 and 15 are provided with clutch elements 16 on their opposing faces. A clutch element 17 is splined to the propeller shaft between the gears 10 and 15 and is engaged by a shifting fork 18 connected to an operating arm 19 of a control rod 20. The control rod 20 is journaled to the housing 1 and extends to the engine and may be equipped with a suitable handle for imparting rotation thereto in either direction for the purpose of shifting the clutch element 17 into engagement with either of the clutch elements 16 or into a neutral position where it is disengaged from either of said clutch elements. The clutch elements 17 when in a neutral position interrupts the drive between the power shaft and the propeller shaft. The clutch element 17 when in engagement with the clutch element 16 of the gear 10 establishes a drive between the power shaft and the propeller shaft wherein the propeller shaft will be rotated in substantially the same number of revolutions as the power shaft. The clutch element 17 when in engagement with the clutch element 16 of the worm gear 15 provides a drive between the power shaft and the propeller shaft wherein the propeller shaft will rotate slower or at a less number of revolutions to the propeller shaft, thereby providing to the propeller a speed changing arrangement and with this arrangement it is possible to drive the boat by the engine at a much reduced speed of that obtained through the gears 4 and 10 making it possible to employ the engine for trolling and similar purposes as well as rendering it easier to handle the boat when negotiating landings in shallow or dangerous waters.

The forked arm 18 is pivotally mounted in the housing 1, as shown at 21.

In my modified form of invention, as shown in Figures 7 and 8, the worm 14 may be eliminated and a spiral rib 22 may be formed integrally with one face of the gear 23 in mesh with the gear 4 and employed in lieu of the gear 13. The spiral rib meshes with the worm gear 15.

While I have shown and described the preferred embodiment of my invention, it will be understood that minor changes in construction, combination and arrangement of parts may be made without departing from the spirit and scope of my invention, as claimed.

Having described the invention, I claim:

A transmission for outboard engines comprising a housing, a supporting tube for the housing and carried by an engine and having a power shaft extending therethrough into said housing, a drive gear in said housing and secured to the power shaft, a propeller shaft journaled to the housing, a propeller secured to the propeller shaft, a counter shaft journaled to the housing and arranged angularly to the propeller shaft, a speed changing gear meshing with the drive gear and fixed to the counter shaft, a pair of clutch elements journaled to the propeller shaft and spaced from each other, a worm and worm gear connecting the counter shaft and one of the clutch elements, a speed changing gear fixed to the other clutch element and meshing with the drive gear, and means for connecting and disconnecting the clutch elements to the propeller shaft.

LEO MAGNEY.